United States Patent
Deiss

(10) Patent No.: US 10,801,249 B2
(45) Date of Patent: Oct. 13, 2020

(54) SEALING TAPE ROLL OF A SEALING TAPE WITH INTERIOR BARRIER LAYERS

(71) Applicant: ISO-Chemie GmbH, Aalen (DE)

(72) Inventor: Martin Deiss, Abtsgmuend (DE)

(73) Assignee: ISO-Chemie GmbH, Aalen (DE)

( * ) Notice: Subject to any disclaimer, the term of this patent is extended or adjusted under 35 U.S.C. 154(b) by 0 days.

(21) Appl. No.: 16/527,813

(22) Filed: Jul. 31, 2019

(65) Prior Publication Data
US 2020/0048953 A1 Feb. 13, 2020

(30) Foreign Application Priority Data
Aug. 7, 2018 (EP) .................................... 18187739

(51) Int. Cl.
| | |
|---|---|
| *B32B 3/26* | (2006.01) |
| *B32B 5/18* | (2006.01) |
| *E04B 1/68* | (2006.01) |
| *E06B 1/62* | (2006.01) |
| *B65H 18/28* | (2006.01) |

(52) U.S. Cl.
CPC ............... *E06B 1/62* (2013.01); *B32B 5/18* (2013.01); *B65H 18/28* (2013.01); *E04B 1/6812* (2013.01); *B32B 2305/022* (2013.01); *B32B 2405/00* (2013.01); *E06B 2001/626* (2013.01)

(58) Field of Classification Search
CPC ....... B32B 5/18; B32B 2305/022; B32B 3/26; B32B 27/065; B32B 2307/726; B32B 3/30; B32B 2307/7246; B32B 2307/7265; E04B 1/6812; E06B 2001/626
See application file for complete search history.

(56) References Cited

U.S. PATENT DOCUMENTS

| | | | | |
|---|---|---|---|---|
| 2012/0058309 A1* | 3/2012 | Deiss | ............ | E04B 1/6812 |
| | | | | 428/158 |
| 2013/0187348 A1* | 7/2013 | Deiss | ............ | F16J 15/02 |
| | | | | 277/647 |

FOREIGN PATENT DOCUMENTS

| | | |
|---|---|---|
| EP | 2 428 632 A1 | 3/2012 |
| EP | 2 666 947 A2 | 11/2013 |
| EP | 2 990 551 A1 | 3/2016 |

OTHER PUBLICATIONS

EP 18 18 739.0 Search Report dated Jan. 17, 2019.

* cited by examiner

*Primary Examiner* — Joanna Pleszcynska
(74) *Attorney, Agent, or Firm* — Kansson Munger McKinley & Kirby Ltd.

(57) ABSTRACT

A sealing tape roll includes a sealing tape wound up into the sealing tape roll. The sealing tape has at least one first barrier layer, which extends in a longitudinal direction of the sealing tape parallel to side surfaces of the sealing tape. The sealing tape also includes a plurality of second barrier layers, which extend over at least 50% of a width of the sealing tape roll between opposite end surfaces of the sealing tape roll. In addition, the sealing tape has a plurality of sealing tape sections, which, in an unwound state of the sealing tape, are arranged behind each other in a row in the longitudinal direction, and a second barrier layer is arranged between each pair of adjacent sealing tape sections.

18 Claims, 6 Drawing Sheets

SEALING TAPE ROLL OF A SEALING TAPE WITH INTERIOR BARRIER LAYERS

FIELD OF THE INVENTION

The present invention relates to a sealing tape roll of a sealing tape of flexible, compressible foam with interior barrier layers.

Sealing tapes are commonly used to seal joints between a frame profile, such as that of a window or a door, and a building wall to seal off the joint against air drafts and driving rain. Such sealing tapes are usually wound up into sealing tape rolls under compression for space-saving storage, for transport, and for easier handling during installation. In addition to the permeability to air and the sealing property against driving rain, the resistance of the sealing tape to the diffusion of water vapor is considered one of the substantial properties of a sealing tape. It is generally the diffusion of water vapor in a functional direction of the sealing tape which is considered, i.e., in the direction between an interior and an exterior side of a room with respect to the joint to be sealed, to create and adjust a diffusion gradient between the interior and exterior sides of the room. To influence the diffusion of water vapor through the sealing tape in the functional direction, at least one barrier layer has previously been provided on at least one of the side surfaces of the sealing tape or within the sealing tape parallel to these surfaces. In an installed state of the sealing tape, this barrier layer extends over the entire cross section of the joint between the frame profile and the building wall. A barrier layer of this type has greater resistance to the diffusion of water vapor than the foam of the sealing tape and is therefore able to reduce the diffusion of water vapor through the sealing tape or to create a diffusion gradient between the interior side and the exterior side of the room.

It has been found that the permeability of a sealing tape with respect to water vapor should be considered over relatively long lengths of the sealing tape. Local differences in the water vapor diffusion resistance of the sealing tape, such as those which can readily occur as a result of manufacturing-related situations, for example, lead to the diffusion of water vapor within the sealing tape in a direction toward areas of lower water vapor diffusion resistance. Such diffusion in the longitudinal direction of the sealing tape leads to the result that the diffusion of water vapor through the sealing tape is undesirably high in comparison to that of a completely homogeneous sealing tape and can deviate from predetermined nominal values. The same applies to the permeability to air in a similar manner.

SUMMARY OF THE INVENTION

It is an object of the present invention to provide a sealing tape wound up into a sealing tape roll with improved and more reliably adjustable water vapor diffusion resistance.

According to an aspect of the present invention, a sealing tape roll comprises a sealing tape of flexible, compressible foam with interior barrier layers. The sealing tape comprises a top surface, a bottom surface, and two side surfaces connecting the top surface and the bottom surface to each other. The sealing tape also comprises a longitudinal direction, which is parallel to the bottom surface and to the side surfaces. The sealing tape is wound up into a sealing tape roll around an axis transverse to the longitudinal direction of the sealing tape in such a way that the top surface of one turn rests against the bottom surface of an adjacent turn of the sealing tape roll, and the side surfaces of the sealing tape form end surfaces of the sealing tape roll. A width of the sealing tape roll is defined as a distance between one end surface of the sealing tape roll and the opposite end surface. The sealing tape also comprises at least one first barrier layer, which extends parallel to the side surfaces and in the longitudinal direction of the sealing tape. The sealing tape also comprises a plurality of second barrier layers, which extend over at least 50% of the width of the sealing tape roll between the opposite end surfaces of the sealing tape roll. In addition, the sealing tape comprises a plurality of sealing tape sections, which, in the unwound state of the sealing tape, are arranged behind each other in a row in the longitudinal direction, wherein a second barrier layer of the plurality of second barrier layers is arranged between each pair of adjacent sealing tape sections of the plurality of sealing tape sections.

Thus, a sealing tape wound up into a sealing tape roll is provided, which tape comprises barrier layers which extend substantially over the entire cross section or over a major portion of the cross section of the sealing tape in its longitudinal direction (first barrier layer) and barrier layers which are arranged transversely to the longitudinal direction (second barrier layers). The at least one barrier layer arranged in the longitudinal direction influences the diffusion of water vapor through the sealing tape in a functional direction transversely to the longitudinal direction, whereas the plurality of second barrier layers arranged behind each other in a row in the longitudinal direction of the sealing tape influence the diffusion of water vapor and/or the permeability to air within the sealing tape in its longitudinal direction. The effect of the diffusion of water vapor in the longitudinal direction within the sealing tape, e.g., caused by inhomogeneities in the sealing tape, can thus be limited to a small local area. Thereby, diffusion of water vapor within the sealing tape in the longitudinal direction of the sealing tape can be prevented at least to a significant degree.

To achieve the desired effect, the plurality of second barrier layers extend over at least 50%, preferably over at least 75%, and more preferably over at least 90% of the width of the sealing tape roll between the opposite end surfaces of the sealing tape roll. The larger the area over which the plurality of second barrier layers extend between the end surfaces of the sealing tape roll and thus between the side surfaces of the sealing tape, the more completely are the sealing tape sections separated from each other in the longitudinal direction. The diffusion of water vapor within the sealing tape in the longitudinal direction can thus be increasingly reduced. In particular, water vapor is increasingly prevented from diffusing around the plurality of second barrier layers. The plurality of second barrier layers can begin at one end surface of the sealing tape roll and proceed toward the opposite end surface. The plurality of second barrier layers, however, can also extend between the end surfaces of the sealing tape roll in such a way that lateral edges of the second barrier layers edges facing the end surfaces are a certain distance away from those end surfaces. In a preferred embodiment, the plurality of second barrier layers extend over the entire distance between one end surface of the sealing tape roll and the opposite end surface of the sealing tape roll.

Similarly, the at least one first barrier layer preferably extends over at least 50%, more preferably over at least 75%, and even more preferably over at least 90% of the thickness of the sealing tape to limit the diffusion of water vapor around the at least one first barrier layer.

Sealing tape rolls also comprise the advantages of space-saving, storage, ease of transport, and ease of handling the sealing tapes. The sealing tape is preferably wound up under compression into the sealing tape roll. The compressed thickness of the sealing tape is preferably less than 25% of the original thickness of the foam. In preferred embodiments, the sealing tape has a compressed thickness of less than 20%, even more preferably of less than 15%, and/or of greater than 5% of the original thickness of the foam.

In an expanded state, the sealing tape preferably comprises a substantially rectangular cross section, wherein a width of the sealing tape is defined as a distance between the side surfaces of the sealing tape, a thickness of the sealing tape is defined as a distance between the top surface and the bottom surface of the sealing tape, and a length of the sealing tape is defined as a distance in the longitudinal direction. In a cross section perpendicular to the longitudinal direction, the top and bottom surfaces form wide sides, and the side surface form, in this cross section, narrow sides of the sealing tape. The length of the sealing tape is considerably greater than its width and its thickness. Because the side surfaces of the sealing tape form the end surfaces of the sealing tape roll, a width of the sealing tape roll corresponds substantially to the width of the sealing tape. Minor deviations can occur as a result of the slight outward bulging of the side surfaces of a sealing tape rolled up into a roll under compression. Such deviations will not be considered when the range (in %) is stated over which the plurality of second barrier layers extend over the width of the sealing tape and of the sealing tape roll. If the plurality of second barrier layers extend over the entire width of the sealing tape roll, they also extend over the entire width of the sealing tape and vice versa.

An "installed state" of the sealing tape is defined as a state in which the sealing tape is arranged in a joint between a frame element, such as a window or door frame, and a building wall. The longitudinal direction of the sealing tape extends around the peripheral joint, and the sealing tape lies flat by its bottom and top surfaces against the frame element and the building wall. One of the side surfaces of the sealing tape is then facing the interior side of the room, and the opposite side surface is facing the exterior side of the room. The functional direction of the sealing tape is defined as the direction in which the sealing tape insulates and seals off the interior side of the room against the exterior side in the area of the joint. The functional direction is therefore perpendicular to the side surfaces and parallel to the bottom surface of the sealing tape and extends from the interior side of the room to the exterior side. The functional direction is therefore perpendicular to the longitudinal direction of the sealing tape.

The at least one first barrier layer is parallel to the side surfaces and thus parallel to the longitudinal direction of the sealing tape and is also at an angle, preferably at a right angle, to the functional direction of the sealing tape. More precisely, a straight line which is parallel to the longitudinal direction of the sealing tape is parallel to a plane or lies in a plane which is parallel to the at least one first barrier layer. Thus the at least one first barrier layer has the effect of creating a seal and increasing the resistance to the diffusion of water vapor between the interior side of the room and the exterior side.

The plurality of interior second barrier layers extend between the side surfaces of the sealing tape and thus more-or-less transversely to the longitudinal direction of the sealing tape. In a preferred embodiment, the plurality of second barrier layers are perpendicular to the side surfaces and extend in an axial direction with respect to the sealing tape roll. The plurality of second barrier layers are therefore substantially parallel to the functional direction of the sealing tape. More precisely, a straight line, which is parallel to the longitudinal direction of the sealing tape, intersects a plane parallel to the plurality of interior second barrier layers preferably at an angle of 90°. If the second barrier layers are oriented axially with respect to the sealing tape roll, it is guaranteed that the second barrier oriented, as desired, in the direction proceeding from the interior side of the room to the exterior side after installation of the sealing tape with the bottom surface of the sealing tape resting against a frame element or against the building wall. The plurality of second barrier layers thus hinder water vapor from diffusing between the individual sealing tape sections and thus within the sealing tape in the longitudinal direction of the tape, but they have no significant effect on the diffusion of water vapor in the functional direction.

In a preferred embodiment, the at least one first barrier layer is arranged inside the sealing tape between two sealing tape strips arranged next to each other transversely to the longitudinal direction and extends in the radial direction with respect to the sealing tape roll. Because the at least one first barrier layer is arranged within the sealing tape, the barrier layer is protected from damage which might occur as a result of external influences during transport and installation, for example. In addition, the at least one first barrier layer then subdivides the sealing tape sections formed by the plurality of second barrier layers into subsections, which are arranged next to each other transversely to the longitudinal direction. The area affected by an unwanted diffusion of water vapor can therefore be further reduced. If the at least one first barrier layer is oriented radially with respect to the sealing tape roll, it is also guaranteed that, after the sealing tape has been installed, the at least one first barrier layer will extend along the joint between the frame element and the building wall and thus seal off the interior side of the room against the exterior side.

In an advantageous embodiment, the sealing tape comprises a drainage layer for collecting and effectively discharging water from the sealing tape. Water which enters the sealing tape undesirably as a result of driving rain, for example, can thins conducted back out of the sealing tape. A wet sealing tape or a wet region of the sealing tape would lead to a disadvantageous increase in thermal conductivity and correspondingly to a lower degree of thermal insulation by the sealing tape. The drainage layer can comprise a foam strip or can be formed by a barrier layer, preferably a harrier layer parallel to the side surfaces of the sealing tape.

For example, a first barrier layer can be configured with multiple plies, wherein one ply forms a drainage layer, which is adapted to conduct intruding water away. The drainage layer can comprise, for example, a membrane or a nonwoven layer. The drainage layer, however can also be formed by a foam. The sealing tape then comprises, for example, at least three sealing tape strips arranged next to each other, at least one of which, preferably an interior sealing tape strip, is configured as a drainage layer. The drainage layer then comprises an at least predominantly open-cell foam, which takes up water and can conduct it away through the open pores by the force of gravity. At the same time, through the use of a foam, the insulating properties of the sealing tape suffer almost no negative effect. In addition, the drainage layer can also comprise a nonwoven layer here as well.

The at least one first barrier layer, in the unwound state of the sealing tape, is preferably perpendicular to the plurality of second barrier layers, as a result of which the sealing tape can be manufactured very easily.

In a preferred embodiment, at least one barrier layer is provided which extends between the opposite end surfaces of the sealing tape roll and in the longitudinal direction of the sealing tape, to educe the size of the areas of the sealing tape in which inhomogeneities of the sealing tape exert a disadvantageous effect on the water vapor diffusion resistance. This additional barrier layer is parallel to the bottom surface of the sealing tape.

The at least one additional barrier layer is then substantially perpendicular to the side surfaces of the sealing tape. The at least one additional barrier layer is arranged inside the sealing tape and subdivides the sealing tape into sealing tape plies lying one above the other in a thickness direction of the sealing tape, the thickness direction being defined perpendicular to the bottom surface of the sealing tape. It is also preferred that the at least one additional barrier layer, in the unwound state of the sealing tape, be perpendicular to the at least one first barrier layer and perpendicular to each of the plurality of second barrier layers. If the at least one first barrier layer is preferably also perpendicular to each of the plurality of second barrier layers, the sealing tape will thus be divided into substantially cubical or block-like sections.

The at least one first barrier layer and/or the plurality of second barrier layers preferably extend over an entire distance between the top surface and the bottom surface of the sealing tape. This provides the advantage that the individual sealing tape strips and sealing tape sections are separated completely by an intermediate barrier layer, and it is impossible for water vapor diffuse unhindered around the associated barrier layers transversely to the longitudinal direction and in the longitudinal direction of the sealing tape.

In an alternative embodiment, the at least one first barrier layer and/or the plurality of second barrier layers extend over only part of a distance between the top surface and the bottom surface of the sealing tape. Foam bridges then remain between the top surface or bottom surface of the sealing tape, respectively, and the at least one first barrier layer and/or the plurality of second barrier layers. These foam bridges protect the first and second barrier layers during production of the sealing tape, in particular when cuts, which could damage the barrier layers, are to be introduced into the sealing tape or any primary product. To guarantee that adjacent sea g tape strips or sealing tape sections are sealed off from each other, however, the at least one first barrier layer and the plurality of second barrier layers preferably extend over a major part of the thickness of the sealing tape, and the foam bridges are made thin. A foam bridge preferably has a maximum thickness of 10 mm, more preferably of 5 mm, and even more preferably of 2 mm. This makes it easy to produce the sealing tape and at the same time avoids any unwanted damage to the barrier layer material. In addition, the cohesion of the sealing tape in the longitudinal direction and in the direction transverse to it is guaranteed even if the individual sealing tape sections are not bonded together by the first and second barrier layers.

Embodiments are also possible in which some of the barrier layers representing the at least one first barrier layer and/or some of the plurality of second barrier layers extend over the entire distance between the top surface and the bottom surface of the sealing tape, whereas other barrier layers representing the at least one first barrier layer and/or other barrier layers of the plurality of second barrier layers extend over only part of the distance between the top surface and the bottom surface of the sealing tape. This can be advantageous with respect to the production of the sealing tape rolls.

At least one second barrier layer of the plurality of second barrier layers preferably comprises two barrier layer sections, wherein each barrier layer section rests flat against one of the sealing tape sections adjacent to the at least one second barrier layer. The two barrier layer sections of the at least one second barrier layer can be bonded to each other by an adhesive, for example, or by the heating of the barrier layer sections, if desired. The two barrier layer sections can also be fused together or bonded together in some similar way. It is obvious that, particularly when they are fused together at least in certain areas, the two barrier layer sections can form a unit, and that it may no longer be possible to distinguish between the individual barrier layer sections in such areas.

In addition or as an alternative to adhering or fusing the two barrier layer sections together, the two barrier layer sections, in a preferred embodiment, can each form a leg of the at least one second barrier layer, and the two legs can be connected to each other by a connecting section of the at least one second barrier layer. The connecting section is preferably an integral part of the two barrier layer sections and is created by deforming a one-piece second barrier layer. In particular, the connecting section is created by folding over or creasing a flat barrier layer along a line so that it forms two legs, each of which forms a barrier layer section, and comprises a connecting section which connects these legs to each other. A barrier layer of this type can be easily produced and introduced into the sealing tape and also offers good sealing properties.

The connecting section of the at least one second barrier layer comprising two barrier layer sections, is then preferably configured with a U-shape or a V-shape and is arranged in the area of the top surface or bottom surface of the sealing tape. The U-shape or V-shape is obtained by folding over or creasing the second barrier layer. Even if a connecting section is provided, the legs or barrier layer sections of the at least one second barrier layer can be bonded together. The apex of a U-shaped or V-shaped connecting section of a second barrier layer extends along a straight line, which is parallel to the functional direction of the sealing tape and thus transverse to the longitudinal direction of the sealing tape.

In one embodiment of the sealing tape roll according to the invention, at least one first barrier layer comprises two barrier layer sections, wherein each barrier layer section rests flat against a sealing tape strip adjacent to the first barrier layer. The two barrier layer sections of the at least one first barrier layer each form a leg of the at least one first barrier layer, and the two legs are connected to each other by a connecting section of the at least one first barrier layer. The connecting section of the at least one first barrier layer is configured with a U-shape or a V-shape and is arranged in the area of the top surface or bottom surface of the sealing tape. With respect to the formation of the two barrier layer sections of the at least one first barrier layer and the formation and arrangement of their connecting section, what was described previously with respect to the at least one second barrier layer having two barrier layer sections and a connecting section also applies here in an analogous manner. The only difference is that the apex of a U-shaped or V-shaped connecting section of a first barrier layer extends along a straight line, which is transverse to the functional direction of the sealing tape, that is, parallel to the longitudinal direction of the sealing tape.

That a connecting section of a first or second barrier layer is "arranged in the area of the top surface or of the bottom surface of the sealing tape" indicates that it is very close to the respective top surface or bottom surface. Thus, for example, an apex of the connecting section can coincide with the top surface or bottom surface or can lie outside the sealing tape. The foam strips or sections of the sealing tape adjacent to such a first or second barrier layer are then completely separated from each other. In particular for production-related reasons, however, it is preferred that a narrow foam bridge remains, as described above, between the connecting section or the apex of that section and the top or bottom surface of the sealing tape, i.e., to whichever surface the connecting section is closer. An apex of the connecting section will then lie within the sealing tape.

To make it as easy as possible to produce the sealing tape roll, in a preferred embodiment, at least two second barrier layers of the plurality of second barrier layers each comprise two barrier layer sections and one connecting section as described above. The connecting sections of these at least two second barrier arranged behind each other in a row in the longitudinal direction of the sealing tape and are arranged in alternation in the area of the top surface and in the area of the bottom surface of the sealing tape. As a result, the sealing tape to be wound up into a sealing tape roll is particularly easy to produce by folding over individual sealing tape sections in opposite directions, as can be derived from the following description under reference to the figures.

In an embodiment which can be produced in a particularly efficient manner, at least one second barrier layer comprising only one barrier layer section is arranged between the at least two second barrier layers comprising two barrier layer sections and one connecting section. The at least one second barrier layer comprising only one barrier layer section preferably extends over the entire distance between the top surface and the bottom surface of the sealing tape.

It is furthermore preferred that, in the unwound state of the sealing tape, the second barrier layers of the plurality of second barrier layers be parallel to each other. The second barrier layers, furthermore, are preferably arranged at equal distances apart from each other in the longitudinal direction of the sealing tape. This allows for all of the sealing tape sections having the same properties and that a sealing tape which is as homogeneous as possible with respect to its sealing and insulating properties is provided. The second barrier layers, however, can also be arranged at a slant to each other, be arranged at different distances apart from each other, and/or have different material properties. The sealing tape sections can also be of different thickness in order to produce a profiled sealing tape.

It is particularly preferred for the barrier layers to be made of a film-like material or an adhesive, especially to be made of a film strip, an adhesive tape, or an adhesive-like fluid medium. Such barrier layer materials can be applied and bonded particularly easily to the foam of the sealing tape and can be readily inspected. In addition, these materials are particularly suitable for use as barrier layer material, because their sealing properties can easily be adjusted as desired.

The at least one first barrier layer can be made of a material different from that of the second barrier layers in order to take into account the difference between the sealing requirements on the first barrier layer in the functional direction and those on the second barrier layer in the longitudinal direction.

For example, the first, second, and any additional barrier layers described herein are made of a film-like material such as a film of polyamide, polyurethane, polypropylene, or copolymers of these. The barrier layers described herein can also be formed by an adhesive, such as a dispersion adhesive, in particular an acrylate adhesive. The barrier layers can all be made of the same material, or they can be made of different materials.

The barrier layers can also be configured with the property of "humidity variability"; that is, their resistance to the diffusion of water vapor changes as a function of the atmospheric humidity of the environment of the barrier layer. The so-called "sD" value characteristic of the water vapor diffusion resistance; it is the water vapor diffusion value relative to the thickness of a layer of air in meters.

A barrier layer preferably has an sD value in the range of 0.05-100 m, more preferably of m or of 0.2-15 m (at 25% relative humidity (RH)). The testing of the sD value is carried out in accordance with DIN EN ISO 12572: 2001. Independently of this or in combination with it, a barrier layer can have an sD value of 0.02-10 m or of 0.03-6 m or of 0.05-2 mat 72.5% RH according to DIN EN ISO 12572: 2001. For example, the sD value can be in the range of 1-10 m at 25% RH and in the range of 0.1-5 m at 72.5% RH. Unless otherwise specified by DIN EN ISO 12572: 2001, the sD values are based on a temperature of 20° C.

It is preferred that the sD value of each of the plurality of second barrier layers be greater than the sD value of the at least one first barrier layer. Consequently, the water vapor diffusion resistance in the longitudinal direction of the sealing tape will be higher than that in the functional direction of the sealing tape. As a result, it is possible to adjust the diffusion of water vapor between the interior side of the room and the exterior side in a targeted manner, whereas the diffusion of water vapor within the sealing tape in the longitudinal direction is increasingly prevented. The sD value of the plurality of second barrier layers is preferably 1.2-times to 25-times, more preferably 3-times to 20-times, even more preferably 5-times to 10-times the sD value of the at least one first barrier layer.

The sD value of a barrier layer at 25% RH preferably differs from the sD value at 72.5% RH (at 20° C. in each case) by a factor of ≥1.1-1.2, preferably of ≥1.5-2, possibly up to a factor of 3-5 or of up to 10-20 or even by a factor of up to 50 or up to 100 or 150 or more. In this way, the dependence of the water vapor diffusion of the barrier layer on atmospheric humidity is defined. The difference between the two sD values of the barrier layer at the two indicated relative humidities can be ≥0.2.5 m or ≥0.5 m or preferably ≥0.75-1 m; it can, for example, be up to 5-10 m or up to 20-25 m or more. As a result, an adequate dependency of the water vapor diffusion resistance, i.e., a dependency sufficient to ensure adequate adaptation of the water vapor diffusion resistance to the environmental conditions, can be achieved even under widely varying environmental conditions, such as in summer or in winter or in different climate zones. The sD value at 25% RH is preferably higher in each case than the value at 72.5% RH.

Preferably, the barrier layers at least partially comprise a synthetic, water-swellable polymer.

A barrier layer as described herein preferably comprises a thickness in the range between 1 μm and 1 mm, more preferably a thickness in the range of 1-500 μm or of 2-250 μm, even more preferably a thickness in the range of 5-100 μm or of 5-50 μm.

The barrier layers can also be configured with multiple plies, in particular as a multi-ply composite layer. For example, at least one ply of at least one additional material can be arranged on one or both sides of a functional layer. The one additional ply or both additional plies, each of which covers the functional layer either partially or completely, can protect this layer, carry or support it, and increase the stability of the barrier layers. The individual plies can consist of the same material or of different materials.

The plies arranged on one or both sides can be in particular nonwovens, fabric, or mesh of inert materials such as polyethylene, polyurethane, polypropylene, polyester, glass fibers, or viscose, possibly even perforated films, in particular films of polyethylene, polyurethane, polypropylene, or polyester. The layers can generally consist of any suitable material which is available in the form of layers and the sD value of which is preferably not higher than that of the functional layer. The plies arranged on one or both sides can consist of a dispersion adhesive, in particular an acrylate adhesive.

The thickness of the layers enclosing the functional layer can have, per side and independently of each other, an overall thickness of 10-2,000 μm, preferably of 10-500 μm, more preferably of 10-250 μm, even more preferably of 10-90 μm.

Generally, the barrier layers preferably form a continuous, nonporous, and non-perforated layer, which is at least substantially impermeable to air. The air permeability of the barrier layers or barrier layer plies is preferably in the range of 0.01-50 l/(m²s), more preferably in the range of 0.01-20 l/(m²s). The air permeability is preferably ≤3-6 l/(m²s) or more preferably ≤1-2 l/(m²s) or ≤0.2-0.5 l/(m²s) or even more preferably ≤0.1-0.3 l/(m²s) according to DIN EN ISO 9237; test area=100 cm² at a measurement pressure (negative pressure) of 1.0 mbar; test unit: Frank 21443; or is not measurable.

The crucial point with respect to the permeability of a sealing tape section to air is generally the overall reduction of the air flow in one direction across the entire cross section of the sealing tape section. If, for example, a plurality of first barrier layers and sealing tape strips are arranged in a row, in alternation, in the functional direction of the sealing tape, the reduction of the air flow through all these barrier layers and sealing tape strips must be taken into account. The air permeability of the overall sealing tape in the functional direction is preferably less than 50 l/(m²s), more preferably less than 30 l/(m²s), under the above-indicated measurement conditions.

In one embodiment, the sealing tape or the sealing tape roll also comprises an additional material, which is applied to a surface of the sealing tape or to the plurality of barrier layers or is contained in the impregnation agent of the foam. The additional material can give the sealing tape special properties. Additional materials which can be considered for use include in particular materials for fire protection (e.g., expandable graphite, incombustible solids, $CO_2$ emitters, etc.), materials for insulation (e.g., polyurethane foam, resins, sealants, etc.), materials for sealing against moisture (e.g., hydrophobic or hydrophilic substances, substances which swell upon contact with water, etc.), materials for sound damping, materials for controlled venting (e.g., catalysts, etc.), materials for hygienic purposes (e.g., disinfectants, etc.), and/or materials for initiating the expansion of the sealing tape (e.g., blowing agents, heat sources, etc.). With respect to the arrangement, the type, and the properties of the additional material, the skilled person will be familiar with alternatives which can be used to satisfy the requirements in a specific case.

The foam of the sealing tape can be made out of any desired open-cell or closed-cell flexible foam such as that made of polyurethane, polyethylene, polyvinyl chloride, or polypropylene; and it can be impregnated to delay its recovery after compression. The density of these types of flexible foams is in the range of 20-200 kg/m³.

The sealing tape strips are preferably made of the same material. Alternatively, the sealing tape strips can be made of different materials. The sealing tape sections are preferably also formed of the same material, but can also be made of different materials.

The flexible foam preferably comprises a compression hardness of more than 2 kPa. The compression hardness is preferably more than 2.1 kPa, more preferably more than 2.2 kPa, and even more preferably more than 2.3 kPa. The compression hardness is preferably less than 4 kPa, more preferably less than 3.8 kPa, and even more preferably less than 3.6 kPa. The compression hardness is a measure of the strength of the foam. The values given here are based on a compression of 40% versus the original thickness. The compression hardness is determined according to DINENISO 3386; the CV40 value is given.

The sealing tapes are preferably impregnated at least partially and preferably completely with an impregnation agent to delay their recovery. The impregnation agent preferably comprises an acrylate dispersion. In an advantageous embodiment, the acrylate dispersion comprises acrylate polymer particles dispersed in a homogeneous phase. It is preferable for the foam to be impregnated with a certain weight-percentage of acrylate dispersion for delayed recovery in such a way that, at 20° C. and 50% relative humidity, the sealing tape recovers from a sealing tape compression of about 9-13% to the point where it seals the joint in less than 24 hours.

A foam which has been impregnated to delay its recovery preferably comprises an air permeability in the range of 50-1,000 l/(m²s), more preferably in the range of 60-600 l/(m²), and even more preferably in the range of 80-400 l/(m²s). The data on air permeability given within the scope of the present application are based on determinations according to DIN ISO 9237 under the standard conditions of a 10-mm-thick foam piece (completely expanded) at a negative measurement pressure of 1.0 bar over a test surface of 100 cm² by the use of a Frank 21443 device.

Finally, it is advantageous for the bottom surface of the sealing tape to comprise an adhesive layer for attaching the sealing tape to a frame element. The adhesive layer will therefore be arranged transversely to the at least one first barrier layer and transversely to the plurality of second barrier layers. In the state in which the sealing tape is wound up into a roll, the bottom surface of the sealing tape is oriented radially toward the outside. The sealing taps: can thus be unrolled along a frame element and rapidly attached to it by the adhesive layer. The adhesive layer is preferably configured as double-sided adhesive tape, which is covered on the external side by a peel-off protective film. The adhesive layer increases or establishes the cohesion of the sealing tape sections.

DETAILED DESCRIPTION OF SPECIFIC EMBODIMENTS

Figure 1:
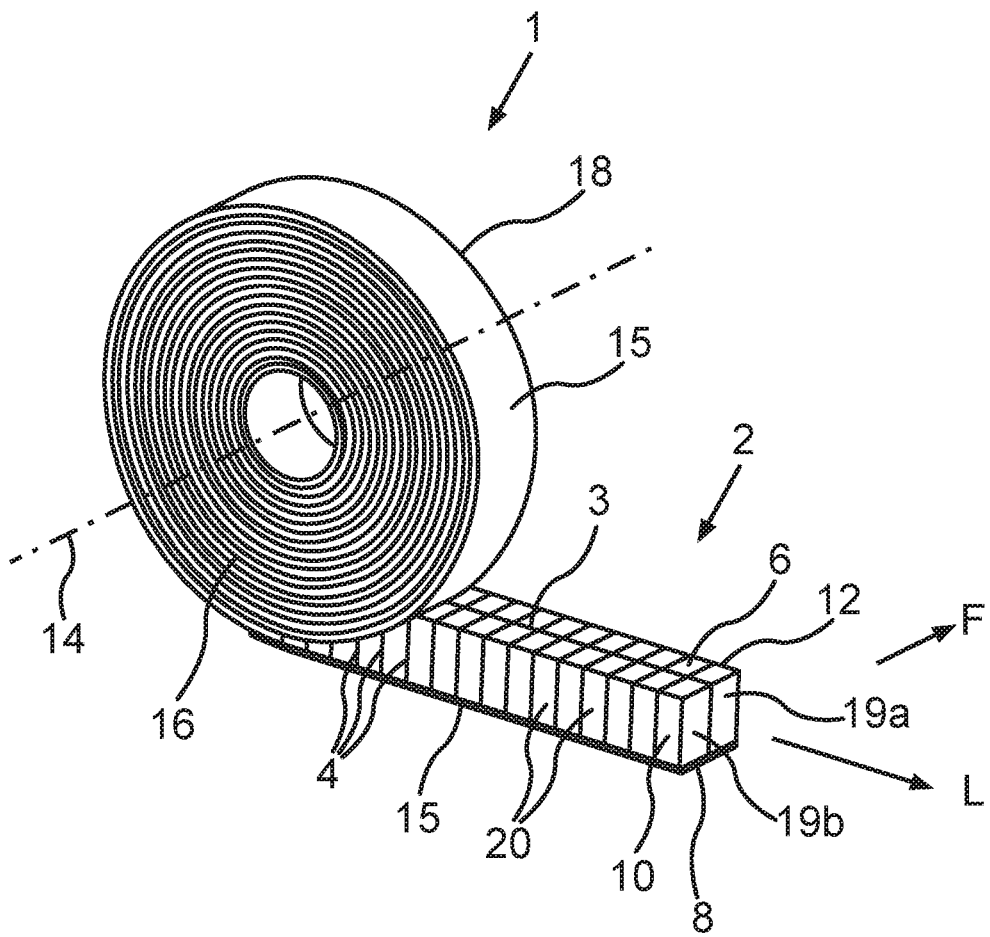
FIG. 1 shows an isometric view of an embodiment of a sealing tape roll according to the invention.

FIG. 1 shows an isometric view of a sealing tape roll 1. Sealing tape roll 1 comprises a wound-up sealing tape 2. The sealing tape 2 in FIG. 1 is shown in a state in which it has been partially unwound, wherein it is the part of the sealing tape 2 at the outer end of the sealing tape roll 1 which is not wound up into the sealing tape roll 1. In the embodiment shown, the unwound part of the sealing tape 2 has already returned from a compressed state to an expanded state in a direction perpendicular to the longitudinal direction L of the sealing tape 2. The thickness of the sealing tape 2 in the expanded state is usually 2-times to 20-times the thickness of the sealing tape 2 in the compressed state, in which it is wound up into the sealing tape roll 1.

The sealing tape 2 comprises a flexible, compressible foam and at least one first barrier layer 3 and a plurality of interior second barrier layers 4. In addition, the sealing tape 2 comprises a top surface 6, a bottom surface 8, and two side surfaces 10, 12 connecting the top surface 6 and the bottom surface 8 to each other. The sealing tape 2 also comprises a longitudinal direction L, which is parallel to the top surface 6, to the bottom surface 8, and to the side surfaces 10, 12. In the unwound state of the sealing tape 2, the tape lies on a flat surface such as an external surface of a frame element. In this state, the side surfaces 10, 12 are perpendicular to the top surface 6 and to the bottom surface 8, and the sealing tape 2 is in a completely expanded state. The sealing tape 2 is preferably wound up under compression into the sealing tape roll 1 so that the sealing tape roll 1 can be stored in a smaller space. In the compressed state of the sealing tape 2, the height of the side surfaces 10, 12 is less than that in the expanded state of the sealing tape 2. That is, the distance between the top surface 6 and the bottom surface 8 in the compressed state is less than that in the expanded state. The distance between the side surfaces 10, 12 remains substantially unchanged upon compression of the sealing tape 2.

Sealing tape 2 is wound up into the sealing tape roll 1 around an axis 14, which is perpendicular to the longitudinal direction L The axis 14 is also perpendicular to the side surfaces 10, 12 of the sealing tape 2. Within the sealing tape roll 1, the top surface 6 of one turn rests against the bottom surface 8 of an adjacent turn of the sealing tape roll 1, and the side surfaces 10, 12 of the sealing tape 2 form the end surfaces 16, 18 of the sealing tape roll 1. The sealing tape 2, furthermore, is wound up into the sealing tape roll 1 in such a way that the bottom surface 8 is oriented radially toward the outside relative to the axis 14 or to the sealing tape roll 1, whereas the top surface 6 of the sealing tape 2 is oriented radially toward the inside. The bottom surface 8 of the outermost turn of the sealing tape 2 of the sealing tape roll 2 therefore forms a circumferential surface of the sealing tape roll 1.

Bottom surface 8 of the sealing tape 2 preferably comprises an adhesive layer 15 for attaching the sealing tape 2 to a frame element. For example, the adhesive layer 15 can be formed by a double-sided adhesive tape, which is attached to the bottom surface 8 of the sealing tape 2 by an adhesive surface. An opposite adhesive surface of the adhesive tape 15 facing away from the bottom surface 8 is covered by a cover layer to protect the adhesive surface and to prevent the individual turns of the sealing tape roll 1 from sticking together. To install the sealing tape 2, this cover layer must be peeled off the adhesive layer 15 in sections, so that the sealing tape roll 1 is then be unrolled along an exterior surface of the frame element. The cover layer consists, for example, of silicone paper. It is also possible to cut off sealing tape strips of a desired length from the sealing tape roll 1 first and to attach said strips to the frame element.

In the embodiment shown here, the sealing tape 2 comprises two sealing tape strips 19a, which, in the unwound state of the sealing tape 2, are arranged next to each other transversely to the longitudinal direction L. A first barrier layer 3 is arranged between the two adjacent sealing tape strips 19a, b. It is obvious that the sealing tape 2 can comprise as many sealing tape strips 19a, b arranged next to each other transversely to the longitudinal direction L as desired, between each adjacent pair of which there may be arranged a first barrier layer 3. In addition or alternatively, a first barrier layer 3 can also be arranged on one or both of the two side surfaces 10, 12. In each case, the at least one first barrier layer 3 is parallel to the side surfaces 10, 12. Water vapor can diffuse in the functional direction F, which is perpendicular to the side surfaces 10, 12 and to the longitudinal direction L, substantially only through the at least one first barrier layer 3.

Sealing tape 2 also comprises a plurality of sealing tape sections 20, which, in the unwound state of the sealing tape 2, are arranged in a row behind each other in the longitudinal direction L. One second barrier layer 4 of the plurality of second barrier layers 4 is arranged between each pair of adjacent sealing tape strips 20 of the plurality of sealing tape strips 20. Water vapor can therefore diffuse in the longitudinal direction L of the sealing tape 2 substantially only through a second barrier layer 4. The layout of the first and second barrier layers 3, 4 is thus one of the key features determining the sealing properties, i.e., the water vapor diffusion resistance, of the sealing tape 2.

Sealing tape 2 is installed in a conventional and intended manner, according to which the bottom surface 8 of the sealing tape 2 is attached to an exterior side of a frame element which is then arranged within a wall opening of a building wall, the frame element and building wall forming a joint to be sealed between them. Within the sealing tape roll 1, the at least one first barrier layer 3 is preferably oriented radially with respect to the axis 14 of the sealing tape roll 1, and the plurality of second barrier layers 4 extend from one end surface 16 to the opposite end surface 18 of the sealing tape roll 1. Thus, in the installed state of the sealing tape, the second barrier layers 4 extend between the frame element and a building wall and also between the interior side of the room and the exterior side. The at least one first barrier layer 3, in contrast, extends peripherally around the joint in the longitudinal direction L of the sealing tape 2, as will be described in detail with reference to FIG. 6.

The at least one barrier layer 3 is preferably perpendicular to the bottom surface 8. In the preferred embodiment according to FIG. 1, the plurality of second barrier layers 4 are perpendicular to the top surface 6, to the bottom surface 8, and to the side surfaces 10, 12, The second barrier layers 4 thus extend in the axial direction through the sealing tape roll 1. More precisely, each second barrier layer 4 forms a plane, which has a radial and an axial component relative to the sealing tape roll 1 and its axis 14. A plane which is formed by a first barrier layer 3 within the sealing tape roll 1, however, has a radial and a tangential component.

First barrier layer 3 and the second barrier layers 4 are shown in FIG. 1 in such a way that they extend over the entire distance between the top surface 6 and the bottom surface 8 of the sealing tape 2. The at least one first barrier layer 3 extends along the entire length of the sealing tape 2 in the longitudinal direction L. Because the second barrier layers 4 extend all the way from the left side surface 10 to the right side surface 12, the sealing tape 2, considered in a cross section through one of the second barrier layers 4, consists exclusively of the second barrier layer 4 in question. Water vapor can then diffuse transversely to the longitudinal direction L only through the first barrier layer 3. The diffusion of water vapor in the longitudinal direction L within the sealing tape 2 is in this case possible only through the individual second barrier layers 4. The diffusion of water vapor within the sealing tape 2 in the longitudinal direction L can therefore be effectively adjusted by varying the water vapor diffusion resistance of the second barrier layers 4.

In the case in which the first barrier layer 3 extends over the entire distance between the top surface 6 and the bottom surface 8, the sealing tape strips 19a, b adjacent to the first barrier layer 3 are connected to each other by the first barrier layer 3 or by an additional adhesive layer on the top and/or bottom surface 6, 8. The sealing tape sections 20 adjacent to a common second barrier layer 4 are in this exemplary embodiment connected to each other by the second barrier layer 4 itself. For example, each strip or section can be adhered to the corresponding barrier layer. It is also possible that an adhesive layer 15 could be provided on the top surface 6 and/or on the bottom surface 8 of the sealing tape 2 in order to connect the sealing tape sections 20 in the longitudinal direction L. The adhesive layer 15 can be formed, for example, by the adhesive layer 15 on the bottom surface 8 of the sealing tape 2 used for attachment to the frame element as described above.

In an alternative embodiment, the at least one first barrier layer 3 and the plurality of second barrier layers 4 extend over only part of the distance between the top surface 6 and the bottom surface 8 of the sealing tape 2. The barrier layers 3, 4 then start from either the top or bottom surface 6, 8 and proceed toward whichever surface is opposite, i.e., either the top or bottom surface 6, 8, but only so far that a bridge of foam remains between the barrier layer in question and the other surface, i.e., either the top or bottom surface 6, 8. This bridge of foam connects the adjacent sealing tape strips 19a, b or sealing tape sections 20 together in the area of the associated barrier layer 3, 4. It is therefore possible for water vapor to diffuse in the longitudinal direction L between two adjacent sealing tape sections 20 through these bridges of foam and around the associated second barrier layer 4. The same also applies to the diffusion of water vapor transversely to the longitudinal direction L between the sealing tape strips 19a, b. The bridges of foam are therefore to be made as small as possible, wherein the bridges preferably have a maximum thickness 1-2 mm. Most of the cross section through one of the barrier layers 3, 4 will then comprise the barrier layer 3, 4 itself, as a result of which the disadvantages of this embodiment are minimized. In contrast, however, this embodiment offers the significant advantage that it is easy to manufacture, as will be described further below with reference to FIGS. 2 and 3.

It is also possible for the plurality of second barrier layers 4 to extent over only part of the width of the sealing tape roll 1 between the end surfaces 16, 18. To achieve the desired effect, however, the plurality of second barrier layers 4 extend over at least 50% of the width of the sealing tape roll 1 and of the sealing tape 2. Each second barrier layer 4 can, for example, be arranged either in the center or off-center between the side surfaces 10, 12 or can start from one of the side surfaces 10, 12 and proceed toward the other side surface 10, 12. Between at least one edge of any such second barrier layer 4 facing a side surface 10, 12 and the corresponding side surface 10, 12 there then remains an area without barrier layer, through which water vapor can diffuse substantially without hindrance. Such an area is therefore to be made as small as possible. Each of the second barrier layers 4 thus extends over at least 50%, preferably over at least 75%, and more preferably over at least 90% of the width of the sealing tape 2 between the side surfaces 10, 12.

Figure 2:
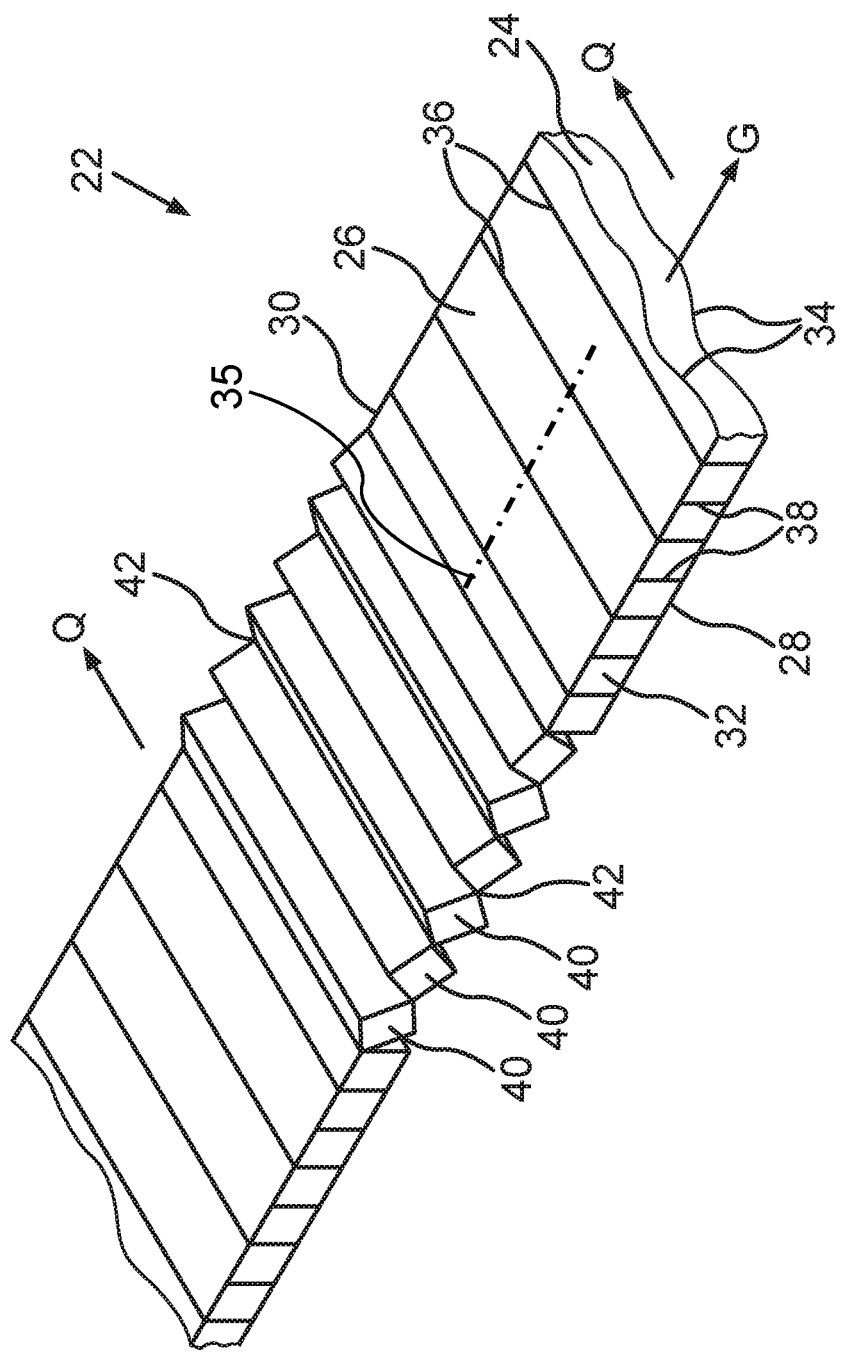
FIG. 2 shows a foam-barrier layer web for producing a sealing tape of an embodiment of a sealing tape roll according to the invention.

FIG. 2 shows an isometric view of part of a foam-barrier layer web 22 for the production of a sealing tape 2 of sealing tape roll 1. The foam-barrier layer web 22 comprises a foam web 24. The foam web 24 has a top surface 26, a bottom surface 28, and two side surfaces 30, 32 connecting the top surface 26 and the bottom surface 28 with each other. The foam web 24 also has a longitudinal direction G, which is parallel to the bottom surface 28 and to the side surfaces 30, 32 of the foam web 24. The foam-barrier layer web 22 also comprises a barrier layer material 34 on at least one of the top surface 26 and the bottom surface 28 of the foam web 24. The barrier layer material 34 serves to produce the plurality of second barrier layers 4. In the embodiment shown here, a barrier layer material 34 has been applied to both, the top surface 26 and to the bottom surface 28 of the foam web 24.

A possible position of a barrier layer material for producing the at least one first barrier layer 3 is shown in broken line 35 in FIG. 2. The at least one first barrier layer 3 can be produced by the skilled person in a known manner. For example, a cut can be introduced into the foam web 24 in the longitudinal direction G of the foam web 24, and a barrier layer material for forming the at least one first barrier layer 3 can be inserted into this cut. Alternatively, the foam web 24 can formed by two foam webs, wherein a barrier layer material is applied to a side surface of one of the foam webs. Both foam webs are bonded to each other in the area of the side surface being provided with the barrier layer material. In the embodiment shown, an additional barrier layer material can also be provided on one or both of the two side surfaces 30, 32 of the foam web 24. All these methods can also be combined. In this way, foam-barrier layer webs 22 with any desired number of first barrier layers 3 can be produced. The at least one first barrier layer 3 or the barrier layer material provided for it can be produced or inserted/applied either before or after application or insertion of the barrier layer material 34 for the plurality of second barrier layers 4.

To produce a sealing tape 2 with interior second barrier layers 4, a plurality of first cuts 36 and a plurality second cuts 38 are introduced into the foam-barrier layer web 22. The first cuts 36 are introduced into the top surface 26 of the foam web 24 in a transverse direction Q of the foam web 24. The first cuts 36 extend over the entire distance between the side surfaces 30, 32 of the foam web 24 and are preferably perpendicular to the top surface 26 and the side surfaces 30, 32. If a barrier layer material 34 has been applied to the top surface 26 of the foam web 24, the first cut 36 passes through this barrier layer material 34. The second cuts 38 are introduced into the bottom surface 28 of the foam web 24 in the transverse direction Q. Each of the second cuts is arranged with an offset in the longitudinal direction G to a first cut 36. The second cuts 38 extend over the entire distance between the side surfaces 30, 32 of the foam web 24 and are preferably perpendicular to the bottom surface 28 and to the side surfaces 30, 32. If a barrier layer material 34 has been applied to the bottom surface 28 of the foam web 24, the second cuts 36 pass through this barrier layer material 34. As a result, parallel strips 40 of the foam-barrier layer web 22 are formed, which are arranged behind each other in a row in the longitudinal direction G of the foam-barrier layer web 22. The first and second cuts 36, 38 are preferably arranged equal distances apart.

As regards the cuts 36, 38, the indications "first" and "second" are not meant to define a chronological sequence in which the cuts are introduced into the foam-barrier layer web. For example, the second cut can be introduced before the first cut is introduced. It is also possible that all of the cuts be made simultaneously.

The first and second cuts 36, 38 do not pass all the way through the foam-barrier layer web 22. Instead, a connecting area 42 remains between two adjacent strips 40.

Figure 3:
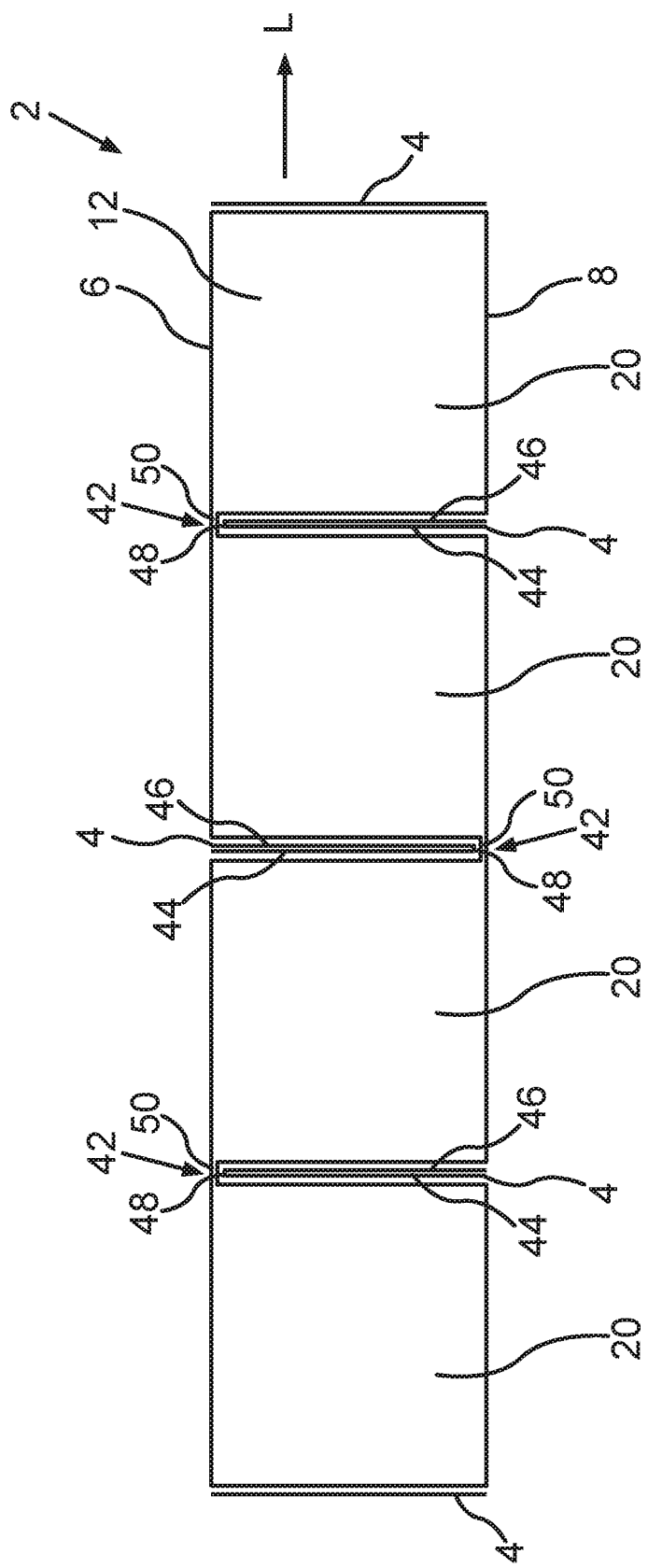
FIG. 3 shows a cross-sectional view of a sealing tape produced according to FIG. 2.

If the first and second cuts 36, 38 pass all the way through the foam web 24, a connecting area 42 can be formed, in case of a first cut 36, only by the barrier layer material 34 on the bottom surface 28; and, in case of a second cut 38, it can be formed only by the barrier layer material 34 on the top surface 26 of the foam web 24. If, however, the first or second cuts 36, 38 do not pass all the way through the foam web 24, a foam bridge 50 remains at the end of the cut in question, as can be seen in FIG. 3. The connecting area 42 then comprises this foam bridge 50. If a foam bridge 50 is present, there is no need to provide a barrier layer material 34 to connect the adjacent strips 40. On the contrary, at least one barrier layer material 34 must be provided only to form a second barrier layer 4. A connecting area 42, however, can also comprise a foam bridge 50 and a barrier layer material 34.

To produce a sealing tape 2 with interior second barrier layers 4, the strips 40 are to be folded over along the connecting areas 42 in such a way that subsections of the top surface 26 of the foam web 24 adjacent to a common connecting area 42 lie opposite each other, and subsections of the bottom surface 28 of the foam web 24 adjacent to a common connecting area 42 lie opposite each other. The individual sections of the barrier layer material 34 formed by the first and/or second cuts 36, 38 are thereby arranged in the interior of the sealing tape 2 and form a second barrier layer 4, as can be seen in FIG. 3.

If the web with interior second barrier layers 4 formed from the foam-barrier layer web 22 in this way is wider than is desired for the sealing tapes 2 to be produced, the web can be divided into a plurality of sealing tapes by introducing cuts into the top and/or bottom surface of the web in the longitudinal direction, i.e., parallel to the side surfaces.

The at least one first barrier layer 3 can also be produced in a manner similar to that discussed above on the basis of FIG. 2. For this purpose, at least one cut is to be introduced in the longitudinal direction G of the foam-barrier layer web 22 and into a top or bottom surface of the foam web 24 or foam-barrier layer web 22 provided with a barrier layer material. The longitudinal strips of the foam web 24 or foam-barrier layer web 22 thus obtained are then to be folded over around the remaining connecting areas.

FIG. 3 shows a cross-sectional view, in the longitudinal direction L of the sealing tape 2, of a sealing tape 2 which can be wound up into a sealing tape roll. The sealing tape 2 can be produced as described above on the basis of FIG. 2. The sealing tape 2, however, can also be produced by providing a foam strip, by introducing cuts into its top and/or bottom surface, and by inserting a second barrier layer into each of these cuts. The skilled person is familiar with alternative possibilities for forming a sealing tape 2 with interior barrier layers 3, 4.

The sealing tape 2 comprises a plurality of sealing tape sections 20, which, in the unwound state of the sealing tape 2, are arranged behind each other in a row in the longitudinal direction L. Between each pair of adjacent sealing tape sections 20, there is a second barrier layer 4. Each second barrier layer 4 can be configured with a single ply or with multiple plies.

In the preferred embodiment shown here, at least one second barrier layer 4 comprises two barrier layer sections 44, 46, wherein each barrier layer section 44, 46 is connected to one of the sealing tape sections 20, in particular a foam strip thereof, adjacent to the second barrier layer 4. This connection can be achieved, for example, by laminating or bonding the barrier layer material 34 onto the foam web 24 or by adhering the barrier layer material 34 to the foam web 24. The two barrier layer sections 44, 46 rest against each other by their facing surfaces. The two barrier layer sections 44, 46 can also be adhered to each other. For example, the sealing tape 2 can be heated to bond the sealing tape sections 44, 46 together, or an adhesive can be used, which is applied to the facing surfaces of the barrier layer sections 44, 46. It is also conceivable that the barrier layer material 34 itself could have adhesive properties, so that the barrier layer sections 44, 46 stick to each other. It is also conceivable that, because at least certain areas of the two barrier layer sections 44, 46 are fused together, it may be impossible optically to distinguish one from the other within the final sealing tape 2.

In the embodiment shown, the two barrier layer sections 44, 46 each form a leg of the at least one second barrier layer 4. These two legs are connected to each other by a connecting section 48 of the at least one second barrier layer 4. The connecting section 48 is preferably an integral part of the barrier layer sections 44, 46. As can be seen from FIGS. 2 and 3 in combination, a second barrier layer 4 with two barrier layer sections 44, 46 and a connecting section 48 is preferably obtained by folding two adjacent strips 40 of the foam-barrier layer web 22 around a connecting area 42. The barrier layer material 34 applied to these strips 40 is thus folded to the inside, so that the sections of the barrier layer 34 previously associated to the top surface 26 or bottom surface 28 of the foam-barrier layer web 22 are now lying opposite to each other in the interior of the sealing tape 2. As a result, the barrier layer material 34 is folded along the connecting areas 42, so that, in the interior of the sealing tape 2, a second barrier layer 4 is created, which is substantially perpendicular to the bottom surface 8 and comprises the two leg-like barrier layer sections 44, 46, which are connected to each other by the connecting section 48 in the area of the connecting area 42. The connecting section 48 is therefore formed at one end of the leg-like barrier layer sections 44, 46. A second barrier layer 4 with two barrier layer sections 44, 46 and a connecting section 48, however, can also be formed in that a V-shaped or U-shaped film is inserted into a previously made cut in the sealing tape 2.

In the exemplary embodiment shown here, however, the connecting section 48 of the second barrier layer 4 is produced by flipping or folding over the second barrier layer 4, i.e., the barrier layer material 34, along the connecting area 42. The connecting section 48 is therefore preferably configured with a U-shape or a V-shape and is arranged in the area of the top surface 6 or the bottom surface 8 of the sealing tape 2. A U-shape is obtained when, for example, the second barrier layer 4 is folded over along the connecting area 42 without becoming creased or experiencing pressure in the longitudinal direction L. If the second barrier layer 4, however, becomes creased in the area of the connecting area 42 or if the sealing tape 2 is subjected to pressure or is compressed in the longitudinal direction L, the connecting section 48 tends to acquire a V-shape. Other geometric configurations of the connecting section 48 are possible. All of these cited geometries of the connecting section 48 can be referred to as a "loop", even if the legs of the loop are usually pressed against each other.

As can be seen in FIG. 3, the connecting sections 48 are arranged in the area of the top surface 6 or the bottom surface 8 of the sealing tape 2. Depending on the depth of the first and second cuts 36, 38, there remains, optionally, a foam bridge 50 between two adjacent strips 40 or sealing tape sections 20, the thickness of which can be selected as desired. If the connecting areas 42 are formed only by the connecting sections 48 of the second barrier layers 4, these then form, in the area of the connecting areas 42, a kind of hinge-like joint, which connects two adjacent strips 40 together in an articulated manner. It must be remembered, however, that as the thickness of the foam bridge 50 increases, the step of folding over the strips 40 in the area of connecting areas 42 which include a foam bridge 50 becomes more difficult. The foam bridges 50, however, provide the advantage of protecting the second barrier layers 4 or the barrier layer material 34 from damage during the introduction of the first and second cuts 36, 38.

To facilitate the folding over of the strips 40 along the connecting areas 42, the connecting areas 42 are preferably made as thin as possible. The thinnest-possible connecting areas 42 are formed by the barrier layer material 34 alone. Due to the risk of cutting through the barrier layer material 34 during the cutting operation in case of only slight deviations of the cutting depth, it can be advisable to allow, in addition, thin foam bridges 50 to remain when the cutting is performed. The foam bridges 50 then additionally contribute to the connecting areas 42. The at least one foam bridge 50 preferably comprises a thickness of no more than 10 mm, more preferably of no more than 5 mm, and even more preferably of no more than 1-2 mm. If no foam bridges 50 are formed, the connecting sections 48 can coincide with the top surface 6 or bottom surface 8 of the sealing tape 2.

As can also be derived from a consideration of FIGS. 2 and 3 in combination, at least two second barrier layers 4 in this preferred embodiment each comprise two barrier layer sections 44, 46 and a connecting section 48. The connecting sections 48 are arranged in alternation in the longitudinal direction L of the sealing tape 2 in the area of the top surface 6 and the area of the bottom surface 8 of the sealing tape 2. This is attributable to the fact that the strips 40 of the foam-barrier layer web 22 are folded over in alternation, i.e., around a connecting area 42 at the top surface 26 of the foam-barrier layer web 22 and then around a connecting area 42 at the bottom surface 28 of the foam-barrier layer web 22. Even if the second barrier layers 4 are configured with only a single ply but do not pass all the way through the sealing tape, they preferably extend into the sealing tape in such a way that they alternate in the longitudinal direction between the top surface 6 and the bottom surface 8.

The discussion, based on FIG. 3, of the configuration of the at least one second barrier layer 4 having two barrier layer sections 44, 46 and one connecting section 48 and the discussion concerning the configuration and arrangement of the connecting section 48 are analogously applicable to the at least one first barrier layer. Here, the sealing tape strips 19 take the place of the sealing tape sections 20; the first barrier layer 3 takes the place of the second barrier layer 4; and the functional direction takes the place of the longitudinal direction L.

Figure 4:
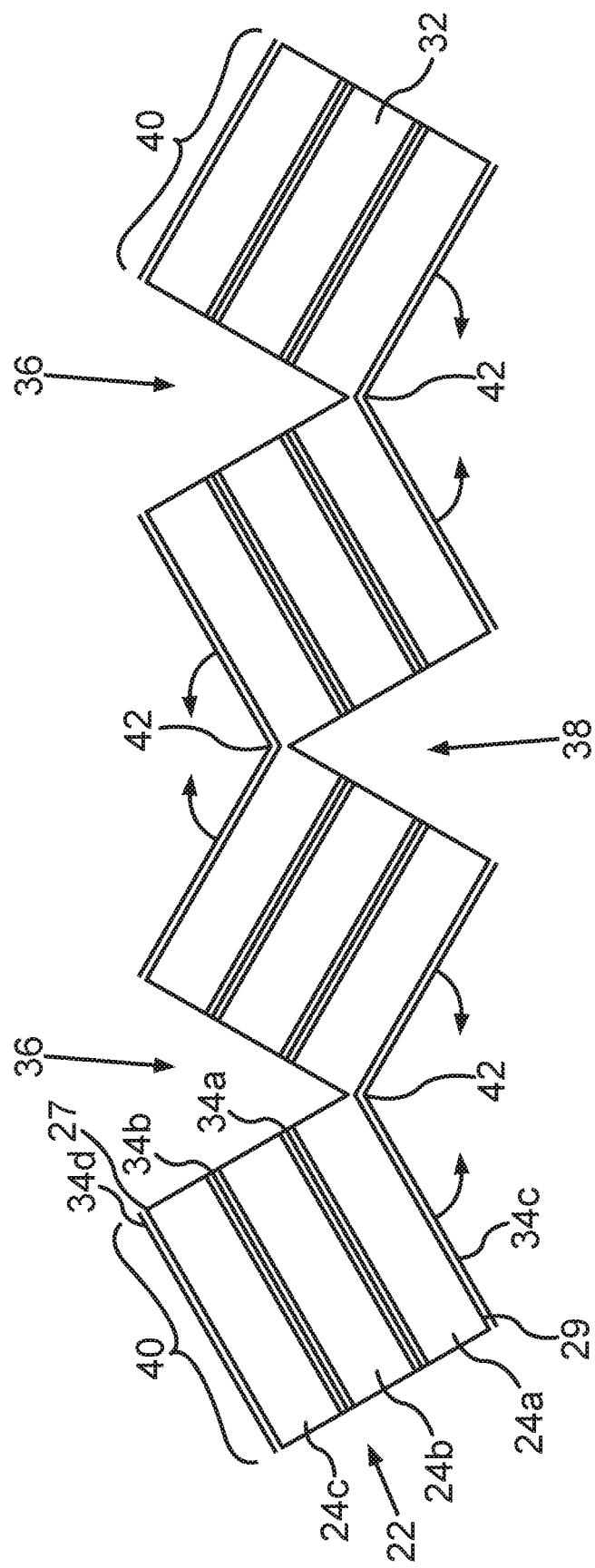
FIG. 4 shows a foam-barrier layer web for producing a sealing tape of an alternative embodiment of the sealing tape roll according to the invention.
Figure 5:
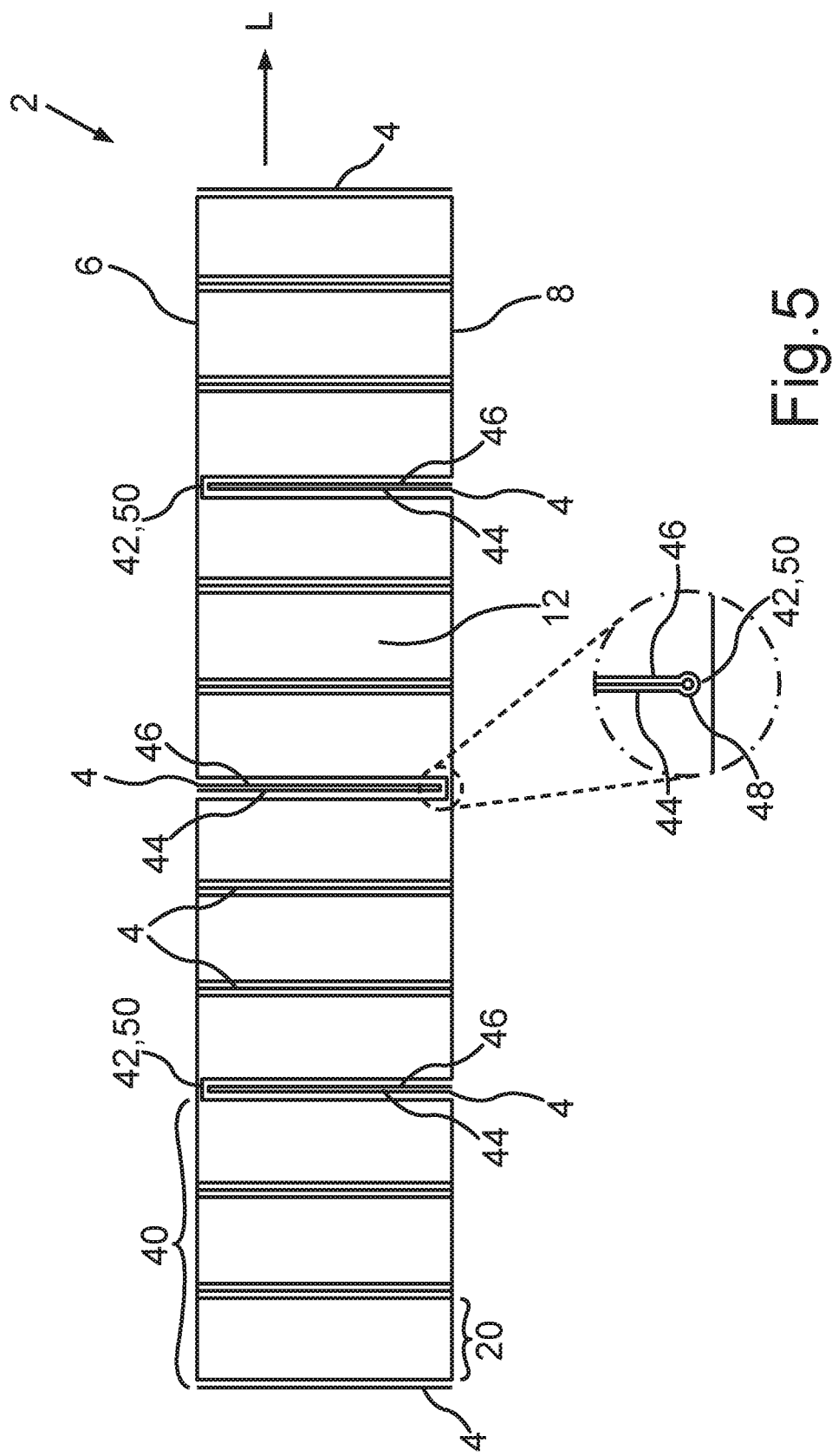
FIG. 5 shows a cross-sectional view of a sealing tape produced according to FIG. 4.

FIGS. 4 and 5 show an alternative embodiment, in which a sealing tape 2 is formed from a multi-ply foam-barrier layer web 22. The multi-ply foam-barrier layer web 22 comprises a first foam web 24a, a second foam web 24b, and a third foam web 24c, which are arranged one above the other. Between each pair of adjacent ones of these foam webs 24a, b, c, there is a ply of barrier layer material 34a, b. Thus, a first ply of barrier layer material 34a is arranged between the first foam web 24a and the second foam web 24b; and a second ply of barrier layer material 34b is arranged between the second foam web 24b and the third foam web 24c. Another ply of barrier layer material 34c, d is arranged at least on the top surface 27 or the bottom surface 29 of the foam-barrier layer web 22. In the present case, a barrier layer material 34c, d is applied to both, the top surface 27 and to the bottom surface 29. In this way, a multi-ply foam-barrier layer web 22 with any desired number of foam webs 24 and as many plies of barrier layer material 34 as desired can be obtained. The foam webs 24a, b, c are bonded to the associated plies of barrier layer material 34a, b, c, d by the use of methods familiar to the skilled person and preferably as already described herein.

First cuts 36 are introduced into the top surface 27 of the foam-barrier layer web 22, and second cuts 38 are introduced into the bottom surface 29 of the foam-barrier layer web 22. With respect to the formation of the first and second cuts 36, 38, reference is made to the discussion introducing cuts 36, 38 in the embodiment of FIGS. 2 and 3, which is also to be applied to this present exemplary embodiment.

In this way, strips 40 arranged behind each other in a row in the longitudinal direction G are formed from the multi-ply foam-barrier layer web 22, wherein each pair of adjacent strips 40 is connected by a connecting area 42. By folding the strips 40 over along these connecting areas 42, a sealing tape 2 according to FIG. 5 is formed, wherein the sections of the top and bottom surfaces 27, 29 of the foam-barrier layer web 22 are now arranged inside the sealing tape 2, as described before. The cut surfaces of the first and second cuts 36, 38 then form the top and bottom surfaces 6, 8 of the sealing tape 2.

As can be derived from a consideration of FIGS. 4 and 5 in combination, the plies of the barrier layer material 34 which are folded over along a connecting area 42 form second barrier layers 4 within the sealing tape 2, each of these barrier layers having two barrier layer sections 44, 46 and one connecting section 48, as already described on the basis of FIG. 3. Barrier layer material plies 34 which have been cut through by the first and second cuts 36, 38 and which are therefore not folded over, i.e., sections of the first and second barrier layer material plies 34a, b of the individual strips 40, each form a single-ply second barrier layer 4 within the sealing tape 2, this layer extending all the way from the top surface 6 to the bottom surface 8 of the sealing tape 2.

A sealing tape is thus formed, in which at least one single-ply second barrier layer 4 comprising only one barrier layer section and extending from the top surface 6 to the bottom surface 8 of the sealing tape 2 is arranged between the at least two barrier layers 4 comprising two barrier layer sections 44, 46 and a connecting section 48.

In the detail view of FIG. 5, the barrier layer sections 44, 46 and the connecting section 48 of a second barrier layer 4 are shown on a larger scale. Here, the connecting section 48 is configured as a loop, substantially having the shape of a U in this embodiment. The foam bridge 50 can also be seen, which connects adjacent sealing tape sections 20 and forms part of the connecting area 42.

The discussion of FIGS. 4 and 5 can analogously be applied to a plurality of first barrier layers 3 and their production. In that case, the sealing tape strips 19 take the place of the sealing tape sections 20; the first barrier layer 3 takes the place of the second barrier layer 4; and the functional direction F takes the place of the longitudinal direction L.

Figure 6A:
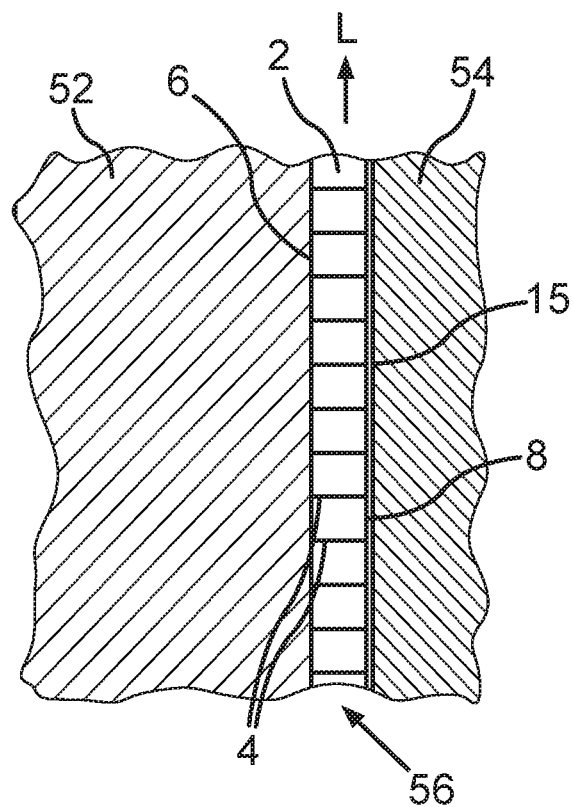
FIGS. 6a, 6b show two different cross-sectional views of an installed situation of a sealing tape of an embodiment of the sealing tape roll according to the invention.
Figure 6B:
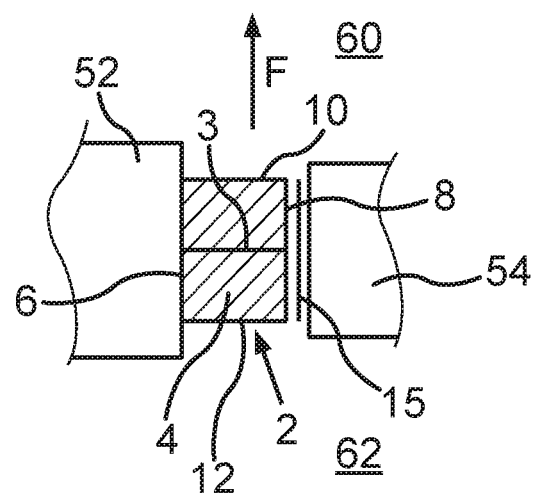

FIGS. 6*a* and 6*b* each show a cross section through part of a building comprising a building wall 52, a frame element 54, and a sealing tape 2. FIG. 6*a* shows a cross section through the building part and the sealing tape 2 on a vertical side and in a vertical plane, and FIG. 6*b* shows a cross section through the building part and the sealing tape 2 on a vertical side and in a horizontal plane.

The frame element 54 is inserted into a masonry opening in the building wall 52. A joint 56, which extends around the frame element 54, is formed between the facing surfaces of the building wall 52 or masonry opening and the frame element 54. It is this joint 56 which is to be sealed. For this reason, the sealing tape 2 is to be arranged in the joint 56. To facilitate installation, the sealing tape 2 is preferably attached to the frame element 54 even before the frame element 54 is inserted into the masonry opening. For this purpose, the bottom surface 8 of the sealing tape 2 comprises an adhesive layer 15, by which the sealing tape 2 is attached to an outside surface of the frame element 54 facing the joint 56. Alternatively, the bottom surface 8 of the sealing tape 2 can also be attached to the surface of the building wall 52 facing the joint 56 by adhesive layer 15.

As can be derived from FIG. 6*a*, the sealing tape 2 is arranged in the conventional manner within the joint 56 in such a way that the bottom surface 8 of the sealing tape 2 rests against the frame element 54, the top surface 6 of the sealing tape rests against the building wall 52, and the side surfaces 10, 12 are facing the interior side 62 of the room and the exterior side 60, respectively. The sealing tape 2 passes around the frame element 50 in the longitudinal direction L. The plurality of second barrier layers 4 are arranged in a plane extending from the frame element 54 to the building wall 52 and also from the interior side 62 of the room to the exterior side 60, so that they have essentially no insulating or sealing effect in the functional direction F of the sealing tape between the interior side 62 and the exterior side 60. The at least one first barrier layer 3 of the sealing tape 2, in contrast, is arranged in a plane extending from the frame element 54 to the building wall 52 and parallel to the side surfaces 10, 12. In the plane of the drawing or parallel to it, the at least one first barrier layer 3 is therefore perpendicular to the functional direction F over the entire cross section of the joint 56 to seal off the interior side 62 from the exterior side 60.

FIG. 6*b* shows a cross-sectional view in a horizontal plane through a second barrier layer 4. It can be seen that the second barrier layer 4 extends through the sealing tape 2 all of the way from the interior side 60 to the exterior side 62 and at least over most of the distance between the frame element 54 and the building wall 52. In this view, the first barrier layer 3 is perpendicular to the plane of the drawing and extends from the top surface 6 to the bottom surface 8 of the sealing tape 2, that is, between the frame element 54 and the building wall 52, in order to seal off the interior side 62 against the exterior side 60.

It is obvious that the sealing tape roll 1 can also be configured differently from the preferred embodiments described herein. In particular, the plurality of second barrier layers 4 do not necessarily have to be perpendicular to the top surface 6, to the bottom surface 8, and to the side surfaces 10, 12 of the sealing tape 2. Instead, the plurality of second barrier layers 4 could also, in the unwound state of the sealing tape 2, be perpendicular to the top surface 6 and/or to the bottom surface 8 and at a slant to the side surfaces 10, 12. In this way, it is possible to exert an effect not only on the diffusion within the sealing tape 2 in the longitudinal direction L of the tape, but also to a certain extent on the diffusion in the functional direction F of the sealing tape 2, that is, transversely to the longitudinal direction L.

Alternatively, the plurality of second barrier layers 4 could also, in the unwound state of the sealing tape 2, be at a slant to the top surface 6, to the bottom surface 8, and to the side surfaces 10, 12. The large number of possible ways in which the second barrier layers 4 can be arranged inside the sealing tape 2 increases the range of possible variations of, and adjustments to, the properties of the sealing tape 2. The methods for producing sealing tape rolls 1 can thus also be adapted as desired.

However, the plurality of second barrier layers 4 separate individual sealing tape sections 20 arranged behind each other in a row in the longitudinal direction L of the sealing tape 2 as completely as desired from each other in order to significantly reduce or even prevent the diffusion of water vapor within the sealing tape 2 in the longitudinal direction L of the sealing tape 2.

If one or more of the barrier layers described herein extend over only part of the distance through the sealing tape, they extend over at least 50% of the cross section of the sealing tape, preferably over at least 75%, and more preferably over at least 90% of the cross section of the sealing tape in the direction in question. In particular, the plurality of second barrier layers 4 extend over at least 50%, preferably over at least 75%, and more preferably over at least 90% of the width of the sealing tape roll 1 between the opposite end surfaces 16, 18 of the sealing tape roll 1. The at least one first barrier layer 3 extends over at least 50%, preferably over at least 75%, and more preferably over at least 90% of the thickness of the sealing tape roll 1 between the top surface 6 and the bottom surface 8 of the sealing tape roll 1.

It is obvious that the discussion presented herein concerning the sealing tapes and the first and second barrier layers are applicable to all of the embodiments described herein and that individual features of the various embodiments can be combined with each other in any way desired.

The invention claimed is:

1. A sealing tape roll of a sealing tape of flexible, compressible foam with interior barrier layers,
    wherein the sealing tape comprises a top surface, a bottom surface, two side surfaces connecting the top surface and the bottom surface, and a longitudinal direction, which is parallel to the bottom surface and to the side surfaces;
    wherein the sealing tape is wound up into the sealing tape roll around an axis transverse to the longitudinal direction of the sealing tape in such a way that the top surface of one turn rests against the bottom surface of an adjacent turn of the sealing tape roll, and the side surfaces of the sealing tape form end surfaces of the sealing tape roll, wherein a width of the sealing tape roll is defined as a distance from one end surface to the opposite end surface of the sealing tape roll;

wherein the sealing tape comprises at least one first barrier layer, which extends in the longitudinal direction of the sealing tape parallel to the side surfaces;

wherein the sealing tape comprises a plurality of second barrier layers, which are arranged transversely to the longitudinal direction and extend over at least 50% of the width of the sealing tape roll between opposite end surfaces of the sealing tape roll; and wherein the sealing tape comprises a plurality of sealing tape sections, which, in an unwound state of the sealing tape, are arranged behind each other in a row in the longitudinal direction, wherein a second barrier layer of the plurality of second barrier layers is arranged between each pair of adjacent sealing tape sections of the plurality of sealing tape sections.

2. The sealing tape roll according to claim 1 wherein the plurality of second barrier layers are perpendicular to the side surfaces and extend in an axial direction relative to the sealing tape roll.

3. The sealing tape roll according to claim 1 wherein the at least one first barrier layer is arranged inside the sealing tape between two sealing tape strips of the sealing tape, which are arranged next to each other transversely to the longitudinal direction, and wherein the at least one first barrier layer extends in a radial direction relative to the sealing tape roll.

4. The sealing tape roll according to claim 1 wherein, in the unwound state of the sealing tape, the at least one first barrier layer is perpendicular to the plurality of second barrier layers.

5. The sealing tape roll according to claim 1 wherein the at least one first barrier layer or the plurality of second barrier layers extend over an entire distance between the top surface and the bottom surface of the sealing tape.

6. The sealing tape roll according to claim 1 wherein the at least one first barrier layer or the plurality of second barrier layers extend over only part of a distance between the top surface and the bottom surface of the sealing tape.

7. The sealing tape roll according to claim 1, wherein at least one second barrier layer of the plurality of second barrier layers comprises two barrier layer sections, wherein each barrier layer section rests flat against one of the sealing tape sections adjacent to the at least one second barrier layer.

8. The sealing tape roll according to claim 7 wherein each of the two barrier layer sections of the at least one second barrier layer forms a first leg and a second leg of the at least one second barrier layer, respectively, and the first and second legs of the at least one second barrier layer are connected to each other by a connecting section of the at least one second barrier layer.

9. The sealing tape roll according to claim 8 wherein the connecting section of the at least one second barrier layer is configured with a U-shape or a V-shape and is arranged in an area of the top surface or the bottom surface of the sealing tape.

10. The sealing tape roll according to claim 3 wherein the at least one first barrier layer comprises two barrier layer sections, wherein each barrier layer section rests flat against one of the sealing tape strips adjacent to the at least one first barrier layer.

11. The sealing tape roll according to claim 10 wherein each of the two barrier layer sections of the at least one first barrier layer forms a first leg and a second leg of the at least one first barrier layer, respectively, and the first and second legs of the at least one first barrier layer are connected to each other by a connecting section of the at least one first barrier layer.

12. The sealing tape roll according to claim 11 wherein the connecting section of the at least one first barrier layer is configured with a U-shape or a V-shape and is arranged in an area of the top surface or the bottom surface of the sealing tape.

13. The sealing tape roll according to claim 8 wherein at least two second barrier layers of the plurality of second barrier layers each comprise two barrier layer sections and a connecting section, and wherein the connecting sections of these at least two second barrier layers arranged behind each other in a row in the longitudinal direction are arranged in alternation in an area of the top surface and an area of the bottom surface of the sealing tape.

14. The sealing tape roll according to claim 13 wherein at least one second barrier layer comprising only one barrier layer section is arranged between the at least two second barrier layers comprising two barrier layer sections and a connecting section.

15. The sealing tape roll according to claim 1 wherein the at least one first barrier layer and the plurality of second barrier layers are made of a film-like material or an adhesive, a film strip, an adhesive tape strip, or an adhesive-like fluid medium.

16. The sealing tape roll according to claim 1 wherein the at least one first barrier layer is made of a material different from that of the plurality of second barrier layers.

17. The sealing tape roll according to claim 1 wherein the bottom surface of the sealing tape comprises an adhesive layer for attaching the sealing tape to a frame element.

18. The sealing tape roll according to claim 1 wherein the plurality of second barrier layers extends over an entire distance between one end surface of the sealing tape roll and the opposite end surface of the sealing tape roll.

* * * * *